(12) United States Patent
Gibson et al.

(10) Patent No.: US 7,510,640 B2
(45) Date of Patent: Mar. 31, 2009

(54) METHOD AND APPARATUS FOR HYDROGEN GENERATION

(75) Inventors: Thomas L Gibson, Utica, MI (US); Nelson A Kelly, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 663 days.

(21) Appl. No.: 11/049,213

(22) Filed: Feb. 2, 2005

(65) Prior Publication Data

US 2005/0189234 A1 Sep. 1, 2005

Related U.S. Application Data

(60) Provisional application No. 60/545,379, filed on Feb. 18, 2004.

(51) Int. Cl.
C25C 1/02 (2006.01)
(52) U.S. Cl. .......... 205/628; 205/630; 205/631; 205/633; 205/635; 205/637; 205/638; 205/639; 204/267; 204/278.5; 204/269; 204/270; 204/275.1
(58) Field of Classification Search .......... 205/628, 205/630, 631, 633, 635, 637, 638, 639; 204/267, 204/278.5, 269, 270, 275.1
See application file for complete search history.

(56) References Cited

U.S. PATENT DOCUMENTS

| | | | |
|---|---|---|---|
| 3,696,286 A | 10/1972 | Ule | 323/15 |
| 4,341,204 A | 7/1982 | Bloxsom | |
| 4,341,607 A | 7/1982 | Tison | 204/129 |
| 4,352,722 A * | 10/1982 | Ohkawa | 205/340 |
| 4,650,554 A * | 3/1987 | Gordon | 205/340 |
| 5,923,158 A | 7/1999 | Kurokami et al. | 323/299 |
| 6,198,037 B1 | 3/2001 | Nakata | 136/246 |
| 6,619,283 B2 | 9/2003 | Ghela | |
| 2006/0065302 A1* | 3/2006 | Gibson et al. | 136/291 |
| 2007/0119718 A1* | 5/2007 | Gibxon et al. | 205/637 |

OTHER PUBLICATIONS

Muhida et al. "A maximum power point tracking for photovoltaic-SPE system using a maximum current controller", Solar Energy Materials & Solar Cells, 2003, vol. 75, pp. 697-706.

Tani et al. "Optimization of Solar Hydrogen Systems Based on Hydrogen Production Cost", Solar Energy, 2000, vol. 68, No. 2, pp. 143-149.

* cited by examiner

Primary Examiner—Bruce F Bell

(57) ABSTRACT

A method for configuring a solar hydrogen generation system and the system optimization are disclosed. The system utilizes photovoltaic modules and an electrolyte solution to efficiently split water into hydrogen and oxygen. The efficiency of solar powered electrolysis of water is optimized by matching the most efficient voltage generated by photovoltaic cells to the most efficient input voltage required by the electrolysis cell(s). Optimizing PV-electrolysis systems makes solar powered hydrogen generation cheaper and more practical for use as an environmentally clean alternative fuel.

35 Claims, 14 Drawing Sheets

METHOD AND APPARATUS FOR HYDROGEN GENERATION

CROSS-REFERENCE TO RELATED APPLICATIONS

This application claims the benefit of U.S. Provisional Application No. 60/545,379, filed on Feb. 18, 2004. The disclosure of the above application is incorporated herein by reference.

FIELD OF THE INVENTION

This system relates to a method and apparatus for electrolysis of water and, more particularly, to photoelectrochemical (PEC) devices and photoelectrolysis of water to produce hydrogen.

BACKGROUND OF THE INVENTION

Currently the major process by which hydrogen is produced is by the steam reforming of methane. Another means of making hydrogen is by the electrolysis of water. The electricity required for electrolysis is mainly derived from the electric power grid, and the predominant source of grid electricity, combustion of fossil fuels, generates emissions, such as nitrogen oxides and particulate matter, as well as carbon dioxide. One way to eliminate such emissions is to use solar generated electricity to electrolyze water to make hydrogen. Presently, efforts are directed toward improving the efficiency, durability, and cost of the solar powered hydrogen production processes.

However, systems consisting of solar cells to make electricity together with electrolyzers to dissociate water into hydrogen and oxygen, as they exist today, cannot produce hydrogen as cheaply as the steam reforming of methane. Several projects have attempted to produce hydrogen gas to supply vehicle-fueling stations by using electricity from photovoltaic panels and commercially available electrolyzers to split water. These projects proved unsatisfactory and were usually short-lived due to the low efficiency and high cost of the combined technology, which only converted about 2%-6% of the solar energy to hydrogen fuel energy, thus, greatly increasing capital costs, the resulting hydrogen fuel cost (at least $11 per kilogram of hydrogen), and the large area covered by the system.

SUMMARY OF THE INVENTION

To overcome the disadvantages of the prior art, a method for designing and operating a solar hydrogen generator or solar powered electrolysis system having at least one photovoltaic (PV) module is provided. The system and method utilize at least one PV cell, supplying power to electrolyze water to produce hydrogen. The method uses the steps of determining the most desirable maximum power point voltage ($E_{mpp}$) for the PV module based on a predetermined relationship between actual operating voltage and actual operating current under load for the PV module and the most efficient operating voltage for the electrolysis system, electrolysis cell or electrolyzer unit (the electrodes and electrolyte used to split water). Next, the number of solar cells in series operating at the $E_{mpp}$ needed to achieve the most desirable $E_{mpp}$ of the entire PV module is determined. The most desirable $E_{mpp}$ is the desired voltage needed to split water into hydrogen and oxygen and satisfy voltage losses (the over-voltage and resistances) that is required to operate the electrolysis system and achieve the maximum efficiency for converting solar energy to hydrogen fuel energy. The terms PV cell and solar cell are used in the art and herein interchangeably. The term PV module refers to one or more cells. The term cluster is used interchangeably with the term module.

In another embodiment of the invention, a method for operating a solar powered electrolysis system having at least one photovoltaic (PV) module is disclosed. The system is made up of one or multiple individual solar cells connected in series, supplying power to an electrolysis system to electrolyze water to produce hydrogen. The method determines the most efficient actual operating voltage and actual operating current of the electrolysis system and matches them (making them as closely equal as possible) to the maximum power voltage $E_{mpp}$ and maximum power point current $I_{mpp}$ drawn from the PV module to operate the electrolysis process. In one aspect, the operating voltage ($E_{oper}$) of the solar powered electrolysis system is determined by testing or other means and should be matched as closely as possible to the maximum power point voltage of the PV module ($E_{mpp}$) based on a predetermined relationship between $E_{mpp}$ for each individual solar cell and $E_{mpp}$ for a PV module constructed from one or several solar cells in series. The number of cells in series (at their maximum power point under the load of the electrolysis system) needed to achieve the most efficient voltage to split water into hydrogen and oxygen and satisfy electrolysis system losses (over-voltage and resistances) is then determined.

In another embodiment, a method for operating a photoelectrolysis system having at least one photovoltaic (PV) solar cell or module of multiple solar cells connected in series or parallel circuits to an electrolysis system for supplying power to electrolyze water to produce hydrogen is provided. The number of PV cells in series to achieve a desired voltage to split water into hydrogen and oxygen and satisfy electrolysis system losses and resistance (the over-voltage) based on the maximum power point voltage of the PV system (module) is determined, based on a predetermined relationship between photoelectrolysis efficiency and operating voltage of the electrolysis system.

Another embodiment discloses a method for operating an electrolysis system having at least one photovoltaic (PV) cell, with two electrodes (the anode and cathode) both connected to the PV system to electrolyze water to produce hydrogen. Electrically conductive electrodes of catalytic materials or coating the surface of the electrodes with catalytic coatings to split water into hydrogen and oxygen and reduce electrolysis system losses and resistances (over-voltages) are sized based on the current and maximum power point voltage ($E_{mpp}$) of the PV and electrolysis systems. A maximum current density of the electrodes required for efficient operation based on a predetermined relationship between electrolysis efficiency and current density is determined. By convention, in electrolysis, the cathode is the electrode where reduction takes place and hydrogen is generated, and it is attached to the negative pole of the solar cell. The anode is the electrode where oxidation takes place and oxygen is generated, and it is attached to the positive pole of the solar cell.

In another embodiment, a method for operating a solar hydrogen generator or photoelectrolysis system is disclosed. Each solar PV module of the system has at least one solar cell and produces the optimum voltage for operating the electrolysis system to produce hydrogen. The PV module is connected to its own separate electrolysis circuit (consisting of an anode, cathode, and electrolyte solution) rather than connecting several PV modules in parallel to a single electrolysis circuit.

In another embodiment, a solar hydrogen generator or photoelectrolysis system having at least one photovoltaic (PV) module delivering 1.8 to 2.5 volts DC ($E_{oper}$) is disclosed. The PV module has a current density as low as possible, which must be less than 12 milliamps per $cm^2$, a nickel-based cathode, and an anode comprising a ruthenium oxide layer or coating on a nickel-based electrode.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The system provides a practical, non-polluting technology for producing hydrogen fuel using photovoltaic semiconductor materials, an electrolyzer, and sunlight, to power fuel cell vehicles and stationary power generation at a cost competitive with other energy sources.

The system, which according to the teachings of the present invention, provides a more efficient solar powered PV-electrolysis system for hydrogen generation, was designed by systematically integrating the photovoltaic circuit and the electrolysis system and optimizing their efficiencies. The optimization process increased the conversion of solar energy to hydrogen fuel energy (the system efficiency) from about 2-6% estimated for prior art PV panel and electrolyzer systems to 7.2% for an optimized integrated system constructed using the same PV materials (crystalline or amorphous silicon). The PV circuit, PV voltage, electrode materials, electrode size, and electrolyte were all integrated and optimized to achieve the highest efficiency.

Costs for PV-electrolysis production of hydrogen fuel were estimated using standard cost analysis approaches. The increase in efficiency by the present system using the same PV material, means that the expenses for the PV modules needed to generate hydrogen for a fleet of fuel cell vehicles or to generate stationary electric power from non-polluting renewable hydrogen would decrease by about a factor of 3.5. The expenses are also reduced because the charge controller, batteries, and DC converter included in a prior art PV-electrolyzer system are all eliminated by the more efficient and simplified design of the current system. The overall reduction in capital cost due to optimization of PV-electrolysis is expected to be at least 75%. The estimated cost of hydrogen fuel generated by PV-electrolysis, which results mainly from capital costs, would be reduced from $11 per kg for the prior art system (see FIG. 1) to about $3 per kg. This decrease in production costs for non-polluting solar hydrogen can be expected to assist in building a future hydrogen economy to largely replace fossil fuel consumption. Any change to hydrogen fuel would eliminate the associated green house gas emissions and resulting global warming.

Figure 1:
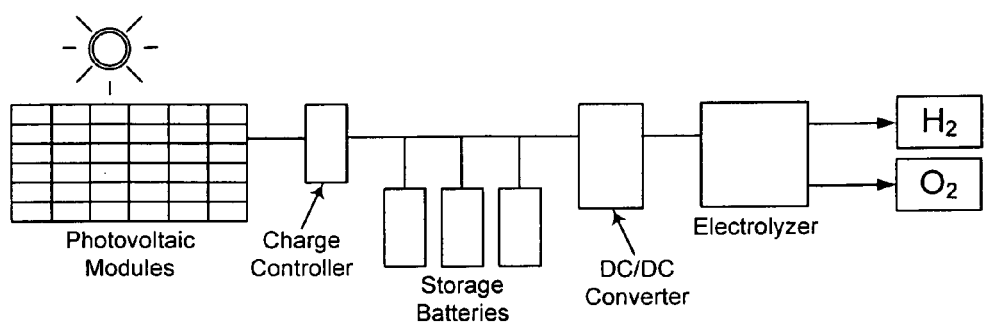
FIG. 1 is a prior art photovoltaic-electrolyzer hydrogen generation system made from a prior art photovoltaic power supply, electrolyzer, and other hardware.

As shown in FIG. 1, the prior art PV-electrolysis systems for solar hydrogen fuel production consisted of an array of photovoltaic modules made up of many solar cells connected in series to give a high voltage, a DC-DC converter, voltage controller, storage batteries, and an electrolyzer, usually consisting of platinum catalyzed electrodes, separated by a specialized membrane, and an aqueous alkaline electrolyte.

PV modules of an exemplary prior art system consist of 36 crystalline silicon (c-Si) solar cells connected in series to produce electricity with an open circuit potential of approximately 22 volts, when not operating under any load, and a potential of 18 volts at their maximum power point ($E_{mpp}$), when delivering their highest current under load to power processes such as electrolysis or charging batteries. These modules and voltages are usually designed specifically to charge battery systems and to power electric appliances either directly or through AC inverters and are not optimized to directly or indirectly power electrolysis cells. The 18-volt potential of the prior art PV panels is too high to efficiently generate hydrogen when connected directly to electrolysis cells (electrolyzer devices).

Figure 2:
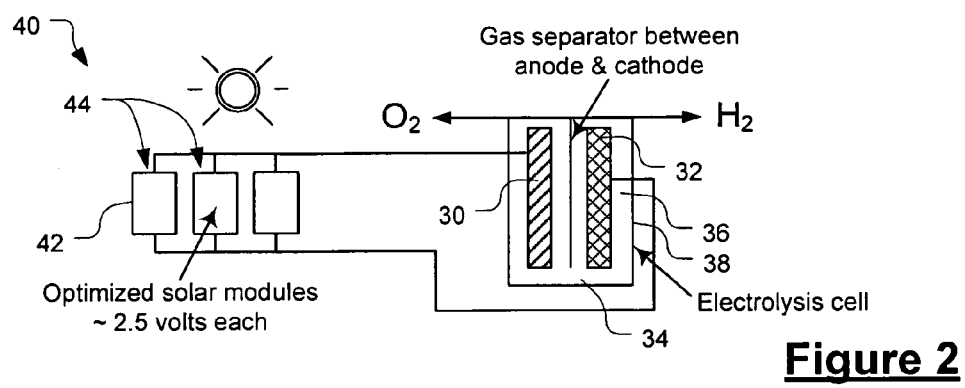
FIG. 2 is a simplified and optimized design for a photovoltaic-electrolysis (PV electrolysis) system using solar cells with the optimum electrolysis potential connected in parallel to an alkaline electrolysis cell with low over potential electrodes—Ni cathode and Ni—$RuO_2$ anode according to the teachings of the present invention.

With general reference to FIG. 2, an efficient electrolysis cell, which was used in the present system comprised a platinum (Pt) or nickel (Ni) cathode 30 and a catalyzed, ruthenium dioxide-coated nickel or titanium (Ni—$RuO_2$ or Ti—$RuO_2$) anode 32 immersed in 5 M potassium hydroxide solution 34. Because these electrode materials catalyze the water splitting reactions, the resulting electrolysis cell 36 has low over potential and high efficiency. Thus, the electrolysis of water in an efficient electrolysis cell begins at about 1.6 volts DC, which includes 1.23 volts, the theoretical potential required to split water, and a minimal overpotential of 0.35 volts for the best catalyzed electrode systems. Traditionally, the most efficient potential for hydrogen production using a PV power source and commonly available electrolysis systems, is usually considerably higher than 1.6 volts due to the limited catalytic capability of most electrode materials, the resistances in the PV-electrolysis circuit including the electrolyte, and the resulting higher overpotential is about 0.5-1.2 volts. In practice, PV devices must usually supply an operating potential ($E_{oper}$) of about 1.8-2.5 volts measured between the anode and cathode when the PV system is connected to a high efficiency alkaline electrolysis cell.

The over potential represents electricity which does not go for useful solar energy conversion to fuel energy (electrolysis) but, instead, is converted to heat. The lower the $E_{oper}$, at which electrolysis occurs, the more efficient the electrolysis cell, because the over potential and the energy wasted as heat formation is minimized.

Designing a PV module 38 that is integrated with the PV-electrolysis system so that it powers the water splitting reaction most efficiently is a key element in optimizing solar hydrogen production. It is necessary to optimize both the PV-electrolysis system 40 which powers electrolysis for hydrogen generation and the electrolysis cell or electrolyzer 36 so that the PV-electrolysis system voltage at its maximum power output ($E_{mpp}$) matches the optimum voltage for the electrolysis cell and, thus, can produce the highest current and highest hydrogen production efficiency. Thus, the most effective approach for optimizing solar powered PV-electrolysis for hydrogen production requires systematically integrating the photovoltaic circuit and the PV-electrolysis system and optimizing their efficiencies. The PV materials, PV circuit, PV voltage, electrode materials, electrode size, and electrolyte type and concentration must all be optimized and then combined to achieve the highest efficiency. Improving hydrogen production efficiency is a major method for reducing the cost of hydrogen fuel production. Simplifying the PV-electrolysis system by connecting the PV modules directly to the hydrogen and oxygen electrodes is another means of improving performance and reducing cost, which will be explained below.

The relationship of hydrogen generation efficiency to PV electrical generation efficiency and the efficiency of the electrolysis cell (electrolyte and electrodes) is given by Equation 1.

$H_2$ Generation Efficiency=*PV* Efficiency×Electrolysis Efficiency (Equation 1)

To optimize the generation of hydrogen from a PV-electrolysis system 40, it is necessary to make several improvements in the prior art design shown in FIG. 1: (1) the maximum power point potential ($E_{mpp}$) supplied by the PV-electrolysis system must match the characteristic operating potential ($E_{oper}$) required by the PV-electrolysis system, (2) the batteries, which are an inefficient means of energy storage, should be eliminated, and (3)any parts that increase resistance, voltage losses, and inefficiency in the PV-electrolysis circuit, including the voltage converter and charge controller should be eliminated as well. The circuit, according to the teachings of the present invention, with the unwanted parts removed, is shown in FIG. 2. As shown in the example in FIG. 2, the circuit connections of the solar cells 42 of the PV panel 44 have been redesigned by using solar modules with the best number of solar cells in series that give the correct $E_{mpp}$ of approximately 2.5 volts DC (ranging about 2 to 3 volts DC for catalyzed electrodes) to match the operating potential ($E_{oper}$) required by the PV-electrolysis system 40. As shown in FIG. 2, three (or more) of the 2.5 volt modules can be connected in parallel to the electrolysis cell to give a greater current and rate of hydrogen production. Any type of solar cells could be used in the optimization process, including but not limited to c-Si, a-Si, $CuInSe_2$ or, CdTe based solar cells, as long as the number and configuration of the solar cells gives the correct $E_{mpp}$ to match the best operating voltage for the PV-electrolysis system.

Figure 13:
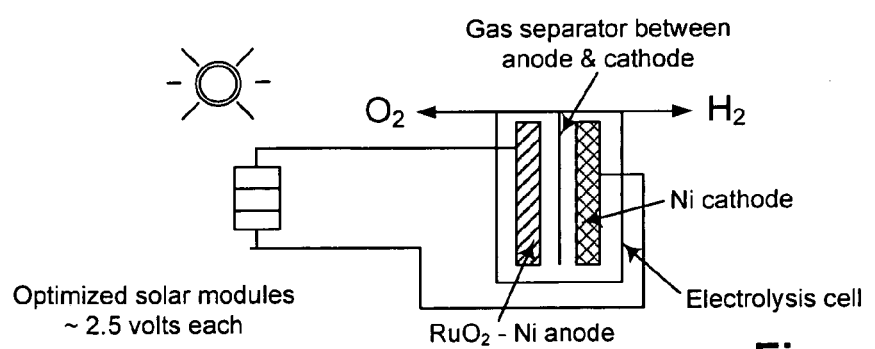
FIG. 13 is a simplified and optimized design for a PV-electrolysis system using solar cells with the optimum electrolysis potential connected in series to an alkaline electrolysis cell with low over potential electrodes—Ni cathode and Ni—$RuO_2$ anode. Multiple PV-electrolysis systems as in FIG. 13 are also contemplated by the invention.
Figure 14:
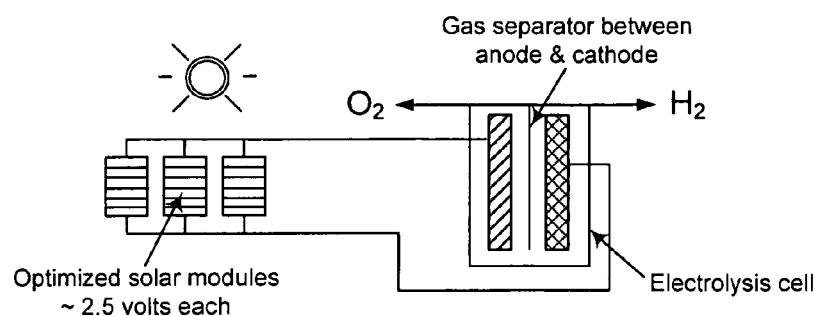
FIG. 14 is diagram depicting a simplified and optimized design for a PV-electrolysis system as in FIG. 2 using solar cells with the optimum electrolysis potential connected in parallel to an alkaline electrolysis cell with low over potential electrodes—Ni cathode, Ni—$RuO_2$ anode; and showing detail of 6 cells in series per module.

Because the 2.5 volt PV modules, shown connected in parallel in FIG. 2, must have equal $E_{mpp}$ and $I_{oper}$ (a quality called voltage and current matching) for optimal performance and efficiency, a problem can arise if one or more of the modules is partially shaded from the sunlight during part of its operation or becomes defective due to age or damage (or for other reasons) and no longer makes the same $E_{mpp}$ and $I_{oper}$ as the other modules. If it is judged that this mismatching may happen, then each of the modules can be connected to a separate electrolysis cell (anode and cathode) rather than being connected in parallel to the same electrolysis cell as shown in FIG. 2. Connecting each optimized PV module to a separate electrolysis circuit in this way could, thus, increase the efficiency of the entire solar hydrogen production system by preventing current mismatching. The increase in efficiency would depend upon the seriousness of the mismatching it avoids. The greatest benefit comes from connecting each individual PV module to a completely separate electrolysis cell with a separate anode and cathode in a separate electrolyte container insulated from any other electrolysis cell. At least, part of the maximum benefit could be obtained by connecting each PV module to a separate anode and cathode, but immersing more than one anode and cathode pair in the same container of electrolyte to save expense, in which case the mismatched PV modules would be only partially insulated from each other. See also FIG. 13 showing a module having several cells in an electrolysis system. Multiple electrolysis systems replicating that of FIG. 13 may optionally be used. Also, multiple electrode sets in a single container, each associated with a PV module are also contemplated.

Figure 3:
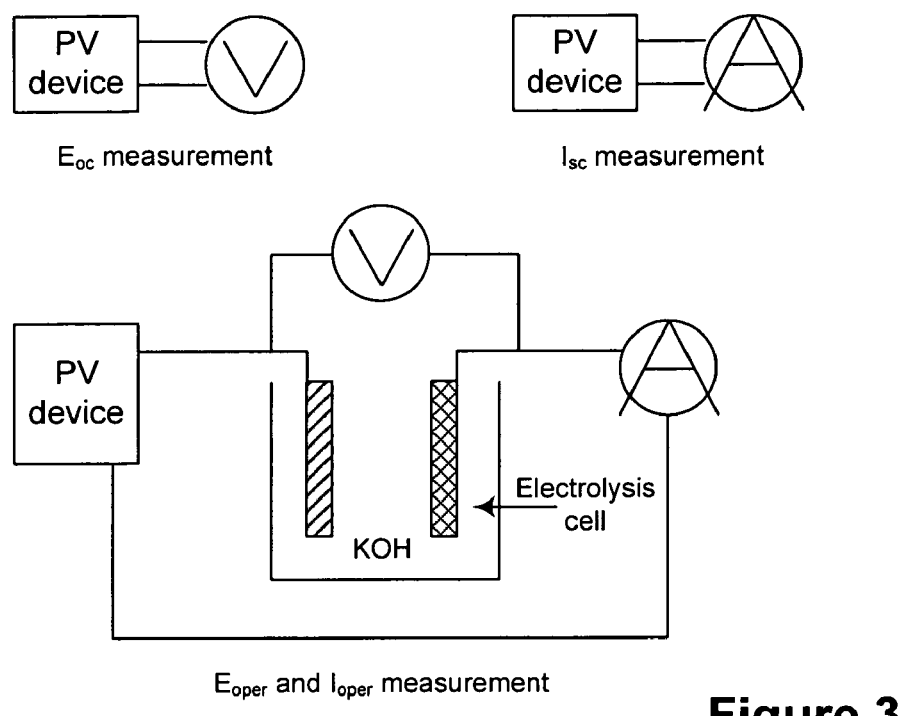
FIG. 3 shows measurement methods for PV-electrolysis parameters.

The 2.5-volt modules, shown in FIG. 2, are optionally made by redesigning a typical PV panel 44. For example, some PV panels 44 have 36 crystalline solar cells in series. Each of these cells might have an inherent open circuit potential ($E_{oc}$) of 0.6 volt, and the entire PV panel might have an $E_{oc}$ of 21.6 volts. Each of these solar cells could have an $E_{mpp}$ of 0.41-0.5 volt, and several cells could be connected in series to make a solar module with the required optimum $E_{mpp}$ of 2 to 3 volts to power water electrolysis. For example, six solar cells (CT Solar, Putnam, Conn.) connected in series can give an $E_{mpp}$ of 2.46 volts (6×0.41=2.46), which matches the $E_{oper}$ requirement of an efficient electrolysis cell (1.8-2.5 volts) described above, as will be explained below in the experimental results section. FIG. 3 illustrates the methods used to measure the $E_{oc}$, the short circuit current ($I_{sc}$), the operating potential during electrolysis ($E_{oper}$) and the operating current during electrolysis ($I_{oper}$), where the symbol V in a circuit indicates a voltmeter and A indicates an ammeter. $E_{mpp}$ of individual solar cells can be estimated from the $E_{mpp}$ of the PV module determined by the manufacturer and the number of cells in series (Equation 2).

$$E_{mpp} \text{ of each solar cell} = \frac{E_{mpp} \text{ of PV module}}{\text{No. of solar cells in series}} \quad \text{(Equation 2)}$$

The $E_{mpp}$ and efficiency of crystalline silicon PV cells are normally measured at standard test conditions which are 25° C. and 100 mW/cm² (one sun irradiance). However, $E_{mpp}$ and efficiency decrease with increasing temperature. This temperature coefficient effect, may be one of the reasons (along with the other sources of over potential of the electrolysis system) that the optimum $E_{mpp}$ of the PV modules (2.0-3.0 volts DC) for real world PV-electrolysis systems is significantly higher than the minimum potential for electrolysis (1.6 volts DC) in high efficiency electrolysis cells.

To optimize PV-electrolysis for hydrogen generation, it is necessary to determine the efficiency of converting solar energy to hydrogen fuel energy as a function of the electrode and PV characteristics, including the electrolysis efficiency (related to electrode over potentials) and the PV efficiency, potential, current, and resulting power generated when it is connected to the electrolysis cell. Experimentally, the efficiency of hydrogen generation from PV-electrolysis is determined by connecting the PV power source, irradiated with sunlight at a known intensity (usually one sun irradiance, which equals 100 mW/cm²), to a high efficiency electrolysis cell or electrolyzer and measuring the electrolysis current $I_{oper}$. Then, the efficiency is calculated using Equation 3.

$$\text{Efficiency} = \frac{I_{oper}(\text{mA}) \times 1.23 \text{ volts}}{PV \text{ area}(\text{cm}^2) \times \text{Solar Irradiance}(\text{mW/cm}^2)} \times 100\% \quad \text{(Equation 3)}$$

In optimization experiments for this embodiment, all the PV systems were connected to an electrolysis cell containing a Ni—RuO$_2$ anode and a Ni cathode, each with a surface area of 128 cm², immersed in 450 mL of aqueous 5 M KOH solution. During electrolysis using PV solar cells with $E_{mpp}$ ranging from 1.5 to 16 volts DC ($E_{oc}$ of 1.8 volts to 20 volts) connected to these electrodes, the actual operating potential difference ($E_{oper}$) ranged from 1.5 to 3.3 volts.

It was determined experimentally that alkaline conditions are much less corrosive than acidic conditions for all the candidate materials used as electrodes, contacts, connectors, and in PV devices which would come in contact with the electrolyte. Chiefly, the encapsulation and insulation materials, including the plastics, Tefzel, Epoxy, and Acrylic, and the electrode materials, nickel, nickel coated with RuO$_2$, platinum, and conductive glass coated with fluorine doped tin oxide (SnO$_2$:F) were not etched or corroded after immersion for more than one month in concentrated potassium hydroxide (5 M KOH). It was also determined that maximum conductivity (approximately 0.55 Siemens/cm at 20° C.) in aqueous KOH solutions occurs at a concentration of 5 M (22-25% by weight). Thus, a 5 M KOH electrolyte solution was chosen for optimization of PV-electrolysis systems.

Figure 4:
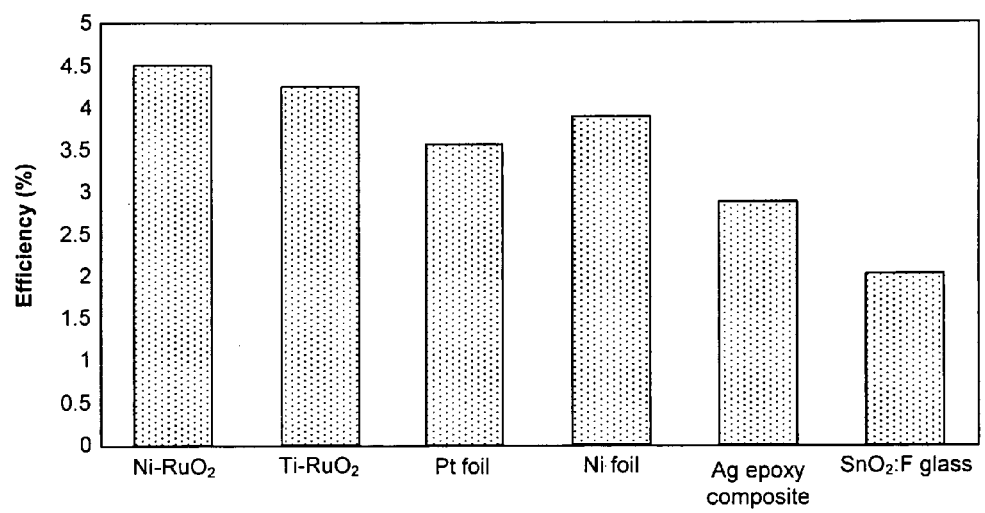
FIG. 4 is a graph depicting the effect of different anode materials on the PV-electrolysis efficiency (solar energy to hydrogen energy conversion efficiency)

As shown in FIG. 4, the efficiency of a range of electrode materials is shown which allows the optimization of the design of the electrolysis cell by minimizing the system overpotential (over-voltage). The type of anode, where oxygen gas is generated during electrolysis, was varied, because the anode has greater over potential than the cathode and its optimization is, therefore, more difficult. It was already known that nickel is a highly efficient and inexpensive material for the cathode, where hydrogen gas is evolved. Six candidate anodes were tested: nickel (Ni) and platinum (Pt), which are especially resistant to corrosion in alkaline electrolytes and have catalytic qualities for water splitting, Ni—RuO$_2$ or Ti—RuO$_2$, nickel or titanium coated with ruthenium oxide, a known catalyst for oxygen electrodes, and two other relatively inexpensive and corrosion resistant conductive materials, glass coated with fluorine doped tin oxide (SnO$_2$:F), a corrosion resistant transparent conductive oxide, and silver epoxy (Ag-epoxy), a metal polymer composite used as a sealant and adhesive. The most efficient anode material was found to be nickel-ruthenium oxide (probably Ni—RuO$_2$), which gave the highest conversion rate from solar energy to hydrogen (4.5%). It should be noted that the $E_{oc}$ (3.8 volts) of the PV solar cells used in the anode tests, two amorphous silicon triple junction solar cells (from Unisolar, Inc., Troy, Mich.) connected in series, approximately matched the optimum $E_{oc}$ range of 3.0-4.0 volts DC). Since the efficiency of the solar cells used in the anode tests for converting sunlight to electrical energy was rated at 6.9%, the efficiency of the electrolysis process even with the best anode material was 4.5%/6.9%×100%=65%. This calculation is derived from Equation 1. Thus, the operation of the optimized electrolysis cell under actual reported conditions was reduced from its estimated maximum efficiency level of approximately 80% to only 65% despite a relatively good match between the PV electrical output and the requirements of the electrolysis system.

Figure 5:
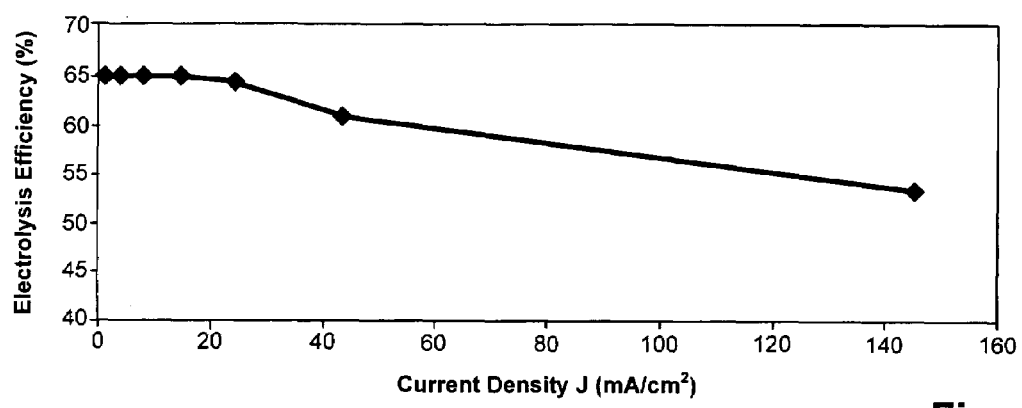
FIG. 5 is a diagram depicting the effect of electrode current density on the electrolysis efficiency.
Figure 6:
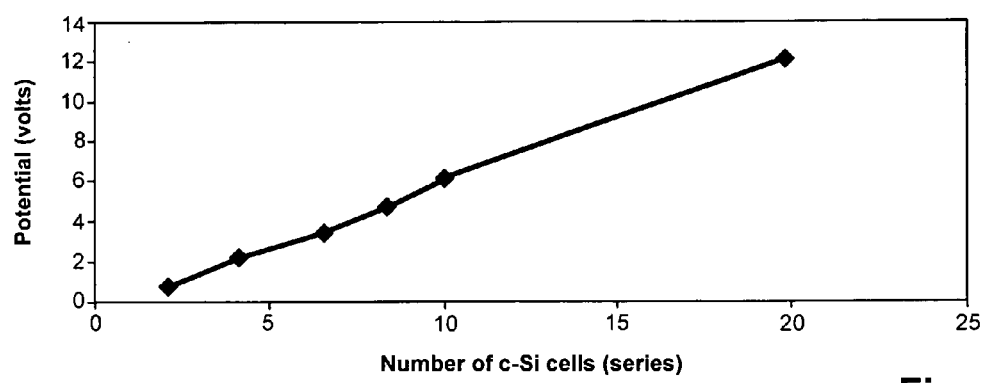
FIG. 6 is a diagram depicting the open circuit voltage ($E_{oc}$) of various numbers of crystalline silicon (c-Si) solar cells in series used to test the PV-electrolysis efficiency.
Figure 7:
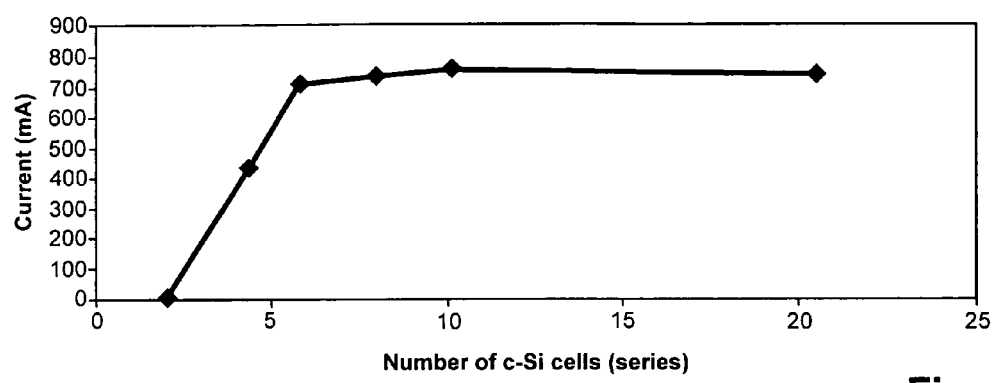
FIG. 7 is a diagram depicting electrolysis operating current ($I_{oper}$) measured in the PV-electrolysis tests with various numbers of c-Si solar cells in series.

The optimum area of the electrodes used in the electrolysis cell depends upon the effect of current density ($J_{oper}$) on electrolysis efficiency (see FIG. 5). The results of PV-electrolysis efficiency measurements at several current densities indicate that efficiency begins to decrease when $J_{oper}$ is greater than about 12 mA/cm². There was no decrease in efficiency under electrolysis conditions used in the optimized PV-electrolysis devices constructed to demonstrate the current system (preferred embodiment), where the surface areas of the electrodes were approximately equal to that of the PV panel, which resulted in a current density of 6 mA/cm² or less.

The cathode (hydrogen electrode) with very good corrosion resistance and lifetime greater than 744 hours consisted of 25.4 micrometer thick nickel foil (99.9%, Strem, Inc).

The anode was prepared from the same nickel foil as the cathode and was coated with RuO$_2$ by a process using heat treatment at 350° C. The process sticks the ruthenium compound firmly onto the nickel and oxidizes the original RuCl$_3$ to form RuO$_2$ by reaction with the hot air in the oven. Ruthenium chloride, RuCl$_3$ (FW 207) with a mass of 1.04 g (0.005 moles), was dissolved in 25 mL of concentrated hydrochloric acid and subsequently diluted to 50 mL with deionized water to yield a 0.1 M solution. This solution was evaporated just to dryness in a fume hood on a hotplate with stirring. The resulting paste was dissolved in 25 mL of 2-propanol to yield a 0.02 M solution. Sheets of nickel foil were prepared and cleaned by first etching them mechanically with very fine sand or emory paper, then etching in 20% hydrochloric acid for 30 seconds, rinsing in deionized water, and air drying. The sheets were coated with the 0.2 M ruthenium chloride solution using a fine spray or brush and sintered in an electric oven at 350 degrees ° C. for 15 minutes. The coating was applied to both sides of each electrode in this way a total of 4 to 5 times, and the resulting electrode was then annealed in the oven at 350 degrees ° C. for 1 hour. Heating in air in the oven oxidized the ruthenium chloride to ruthenium dioxide (RuO$_2$) which produced a stable layer of $RuO_2$ approximately 2.3 micrometers thick. Then, the coated electrode was cooled, soaked in 5 M KOH solution at least 1 hour, and rinsed thoroughly with water to remove any excess unreacted $RuO_2$. The total coating was approximately 0.1 mg $RuO_2/cm^2$. This process yields a stable catalyst coating on the electrode which does not come off during its use in alkaline electrolysis. The resulting electrode did not lose its coating or catalytic activity over extended use (>1000 hr) and was less expensive to make and more efficient than a similar $RuO_2$ coated titanium electrode.

Figure 8:
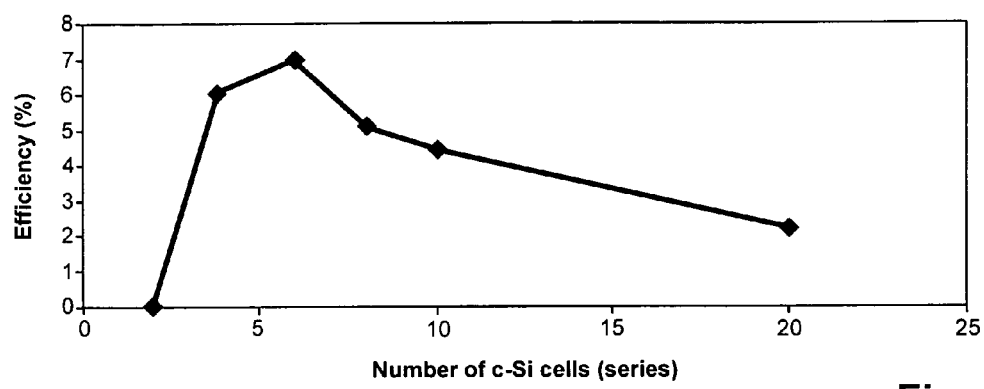
FIG. 8 is a diagram depicting the efficiency of PV-electrolysis systems (the solar energy to hydrogen conversion efficiency) as a function of the number of c-Si solar cells in series.
Figure 9:
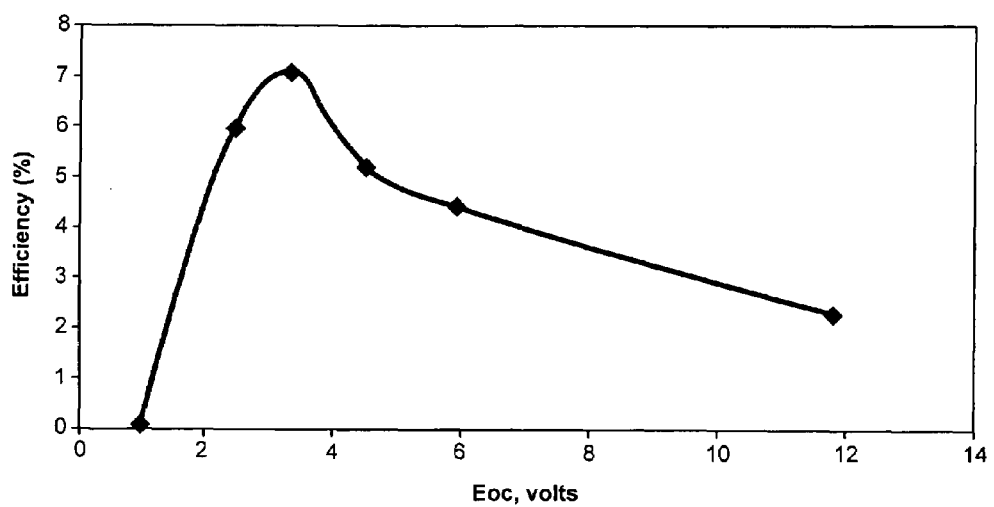
FIG. 9 is a diagram depicting $E_{oc}$ corresponding to the optimum efficiency of PV-electrolysis systems measured with a range of potentials from Connecticut Solar c-Si solar cells in series with a high efficiency electrolysis cell.

The other major system which must be improved to optimize PV-electrolysis is the semiconductor PV module itself. Optimizing the PV module system requires that the PV voltage delivered under natural solar radiation match the most efficient voltage for operating the electrolysis cell (already optimized above). To determine the optimum $E_{oc}$ and $E_{mpp}$ required from a PV panel to produce the most hydrogen (the highest PV-electrolysis efficiency), various numbers of crystalline silicon solar cells (Connecticut Solar) with open circuit voltage $E_{oc}$ of 0.59 volts were connected in series to the optimized electrolysis cell, with a highly efficient Ni—$RuO_2$ anode and a Ni cathode, to measure the current through the electrolysis cell ($I_{oper}$) and calculate the hydrogen generation rate over a range of various numbers of solar cells, $E_{oc}$, and $E_{mpp}$ (see FIGS. 6-9). The electrolysis operating current and potential were measured in an electrolysis cell with 128 cm$^2$ electrodes and 5 M KOH electrolyte as shown schematically in FIG. 3, and the efficiency of solar energy conversion to hydrogen fuel energy was calculated using Equation 3. The efficiency results plotted versus the number of solar cells in series are presented in FIG. 8. These results showed that the maximum efficiency occurred using six cells in series with a module having an $E_{mpp}$ of 2.5 volts and $E_{oc}$ of about 3.5 volts (FIG. 9). It is envisioned that other PV solar cells such as triple junction thin layer amorphous silicon (a-Si), thin layer cadmium telluride (CdTe), thin layer copper indium diselenide ($CuInSe_2$), combined a-Si and c-Si photovoltaics, or others could be used in he same manner as the crystalline silicon (c-Si) cells in the above example.

Table 1 shows results that were obtained for the solar hydrogen generation systems obtained as described above using inexpensive silicon PV panels.

trolysis system was about equally efficient (65-66%) for both kinds of silicon-based solar cells. This result indicates that there was a fairly good match between the $E_{mpp}$ of the optimized PV system and the $E_{oper}$ of the optimized electrolysis system in each case. A number of c-Si solar cells from other sources gave similar optimization results (OK Solar, Shell Solar, and Sharp Solar).

The most efficient PV-electrolysis system made with the Connecticut Solar c-Si cells produced a current of 0.77 A for a 138 cm$^2$ module under standard test conditions (one sun of AM 1.5 global sunlight). This translates to a production rate of approximately 1.04 moles of hydrogen per hour for a 1.0 m$^2$ panel of optimized solar cells. This generation rate would require a PV array with an area of 36 m$^2$ (dimensions of 19.5 feet by 19.5 feet) to keep a fuel cell vehicle supplied with enough hydrogen (3.2 kg/week) for typical driving requirements (assuming that a fuel cell vehicle will average 10,000 miles annually with a fuel economy of 60 mpg). Using the system according to the teaching of the present invention to construct and optimize a PV-electrolysis system with high efficiency makes it practical to fuel vehicles with renewable hydrogen and resolve all issues of pollution from motor traffic.

Solar powered photovoltaic-electrolysis systems for hydrogen generation can be optimized using the methods of this system (1) either roughly by means of rules of thumb or (2) more exactly by systematically measuring the electrical and electrochemical characteristics of the PV and electrolysis devices to find the most efficient type, voltage, and number of the solar cells to give the highest conversion rate of solar energy to hydrogen fuel energy. The rate of water splitting by electrolysis using the optimized anode and cathode materials (FIG. 4) was first measured as a function of the potential applied to the electrodes (operating potential, $E_{oper}$) using a DC power supply. It was found that the current in the electrolysis experiments is proportional to the rate of electrolysis, the production of hydrogen gas, and hydrogen fuel energy, according to Faraday's Law (Equation 4) where F is Faraday's constant (~96,500 coulombs/equivalent weight) and increases with increasing operating potential.

TABLE 1

Solar Hydrogen Generation Using Amorphous and Crystalline PV Materials

| Source | Type | Best $E_{oc}$ (volts) | Best $E_{mpp}$ (volts) | Electric Gen. Efficiency (%)* | $E_{oper}$ (volts) | Electrolysis Efficiency (%) | Best H$_2$ Gen. Efficiency (%) |
|---|---|---|---|---|---|---|---|
| Unisolar | a-Si | 3.8 | 2.7 | 6.9 | 2.1 | 65 | 4.5 |
| CT Solar | c-Si | 3.5 | 2.5 | 10.9 | 2.0 | 66 | 7.2 |

*Based on the rated power of the original PV panel operating at its maximum power point For the a-Si cells, which have an $E_{mpp}$ of ~1.35 volts ($E_{oc}$ of ~1.9 volts), two a-Si solar cells are connected in series to give an optimized voltage approximately equal to the optimized voltage from six c-Si solar cells in series (Table 1).

As shown by Table 1, the c-Si PV material from Connecticut Solar (Putnam, Conn.) gave the best hydrogen generation efficiency (7.2%) when optimized to deliver an $E_{oc}$ of 3.5 volts. The triple-junction a-Si solar cells were obtained from Uni-Pac 10 panels purchased from United Solar Systems Corporation of Troy, Mich. The a-Si solar cells gave a lower efficiency than the c-Si cells due to their inherently lower electrical generation efficiency. The operation of the elec- $$\text{Mass of } H_2 = \frac{\text{equivalent weight} \times I_{oper} \times \text{time}}{F} \quad \text{(Equation 4)}$$

When a PV source is used for the direct current, the DC potential applied to the electrolysis system is limited by the output of the PV circuit, and the electrolysis current is limited by the applied potential and the series resistance of the electrolysis system as well as the response of the PV system to operating under the load created by the electrolysis system.

The potential actually applied by a PV system is not the open circuit potential $E_{oc}$, but the operating potential $E_{oper}$ (both measured as shown in FIG. 3). $E_{oper}$ is almost always much lower than $E_{oc}$ because of the resistance of the load (electrolysis system). For the PV system to most efficiently power the electrolysis, the PV modules must be capable of giving their best performance under the potential and load conditions required by the electrolysis cell. The best performance conditions of a PV module or solar cell are called its maximum power point (mpp), defined by the potential ($E_{mpp}$) and current ($I_{mpp}$), at which it produces its maximum power ($P_{mpp}=E_{mpp} \times I_{mpp}$). If the $E_{mpp}$ and $I_{mpp}$ correspond closely to the operating conditions, $E_{oper}$ and $I_{oper}$ of the electrolysis system, the efficiency of solar energy conversion to hydrogen will be optimized, giving the greatest hydrogen production for a given system and time. The mpp is found by plotting the current (I) versus potential of the PV device while it is irradiated by sunlight of a known intensity (Emery, 2003). These measurements are usually carried out under standard test conditions (STC) using 100 mW/cm$^2$ i.e., 1000 W/m$^2$ of sunlight—called one sun, the equivalent of average summertime sunlight for cloud free conditions at noon in the central northern hemisphere at the surface of the earth (AM 1.5 Global).

Figure 10:
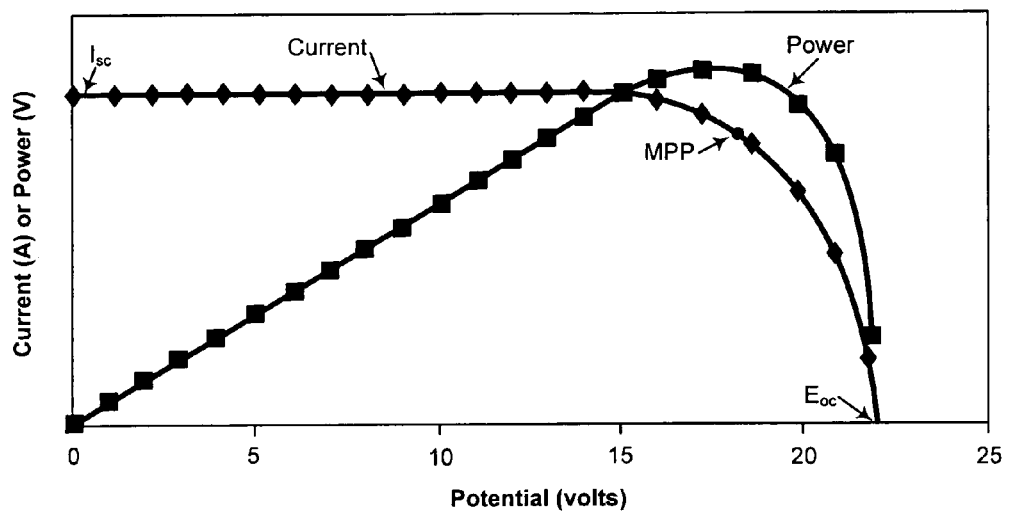
FIG. 10 is a diagram depicting current and power versus potential for a photovoltaic module. The current at the maximum power point (mpp) is identified.

An example of the power curve of a PV module, which is generated by multiplying the current times the potential, is shown in FIG. 10. The maximum power point (mpp), with characteristic $E_{mpp}$ and $I_{mpp}$ values, is a property of each photovoltaic cell or module of several multiple cells in series. As shown in FIG. 10, a PV system gives its greatest power when operating under a load with an optimal resistance ($E_{mpp}/I_{mpp}$). If the circuit resistance is extremely low, the circuit approaches a short circuit condition under which the power approaches zero (FIG. 10). The maximum power point potential ($E_{mpp}$), which is the potential of the PV system giving its greatest power, is less than the open circuit potential ($E_{oc}$), where R approaches infinity and I approaches zero. The optimum PV-powered electrolysis system must have a characteristic maximum power point such that $E_{mpp}$ and $I_{mpp}$ closely match the operating voltage ($E_{oper}$) and operating current ($I_{oper}$) of the electrolysis cell, i.e., their dividend ($E_{mpp}/I_{mpp}$) matches electrolysis cell operating resistance ($R_{oper}$). Since the resistance of an electrolysis cell is non-linear and non-ohmic, it could not be measured directly with a simple ohm meter (as one can measure the resistance of a wire), and resistance measurements were not used in optimizing the PV-electrolysis system.

Figure 11:
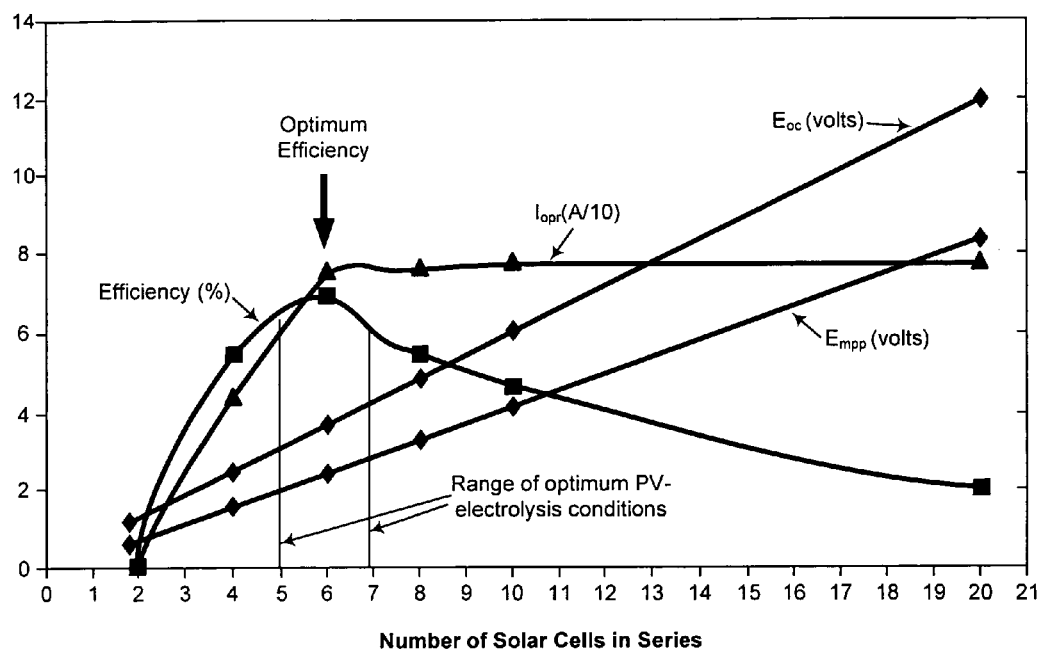
FIG. 11 is a diagram depicting the optimum efficiency range for PV-electrolysis using Connecticut Solar c-Si solar cells wired in series. This figure also shows several other parameters including $E_{oc}$, $E_{mpp}$, and $I_{oper}$ as a function of the number of c-Si solar cells wired in series to an alkaline electrolysis cell with low over potential electrodes—Ni cathode and Ni—$RuO_2$ anode.

However, the PV-electrolysis system can be effectively optimized with the process of this system by: (1) using optimized anode and cathode materials, optimal current density on the electrodes, and optimal electrolyte concentration, (2) designing the PV module to give the optimal $E_{mpp}$ 2.5 volts DC that matches the most efficient range of operating potential ($E_{oper}=1.8$ to 2.5 volts). Thus, a rule of thumb for PV-electrolysis optimization is to use a PV module with $E_{mpp}$ of 2.0 to 3.0 volts DC to match the best operating potential of the optimized electrolysis cell $E_{oper}$ of 1.8 to 2.5 volts. The current and power curves plotted versus potential for this type of PV module are illustrated in FIG. 11. Some PV-electrolysis systems require $E_{mpp}$ values higher than 2.5 volts DC (up to 3.0 volts DC) to reach the maximum efficiency for hydrogen production from a single electrolysis cell. Several examples of crystalline silicon PV materials were optimized by the process of this system. Six c-Si solar cells (Connecticut Solar) connected in series gave the highest optimum efficiency (7.2%) for hydrogen production with $E_{mpp}$ of 2.5 volts DC. The reason for the superior performance of the CT Solar cells is due to their $E_{mpp}$ value of 0.41 volts per solar cell which allowed six cells in series to give $E_{mpp}$ of 2.46 volts (6×0.41) which closely matched the optimum $E_{oper}$ requirement of the electrolysis cell.

In practical terms, too little potential ($E_{mpp}$ and $E_{oc}$) is probably worse than too much because the efficiency falls off more sharply below the optimum potential than above the optimum potential (FIGS. 9 and 11). FIG. 11 also shows the optimum range of PV potential ($E_{mpp}$ and $E_{oc}$) needed to drive electrolysis with the greatest efficiency. Thus, the detailed procedure for making PV-electrolysis systems would be to use enough solar cells in series to give an $E_{mpp}$ as close as practical to 2.5 volts DC, and preferably in the range of 2.0-3.0 volts (and/or an $E_{oc}$ in the range of 3.0-4.0 volts), preferably in the middle or higher part of these ranges rather than the lower end. Thus, if the $E_{mpp}$ of the PV module is less than 2.5 volts (the $E_{oc}$ is less than 3.5 volts), one more solar cell should usually be added in series with each module. The additional solar cell in each module would increase $E_{mpp}$ by about 0.41 volts and $E_{oc}$ by about 0.6 volts. Several of these optimized solar systems with about 2.5 volts $E_{mpp}$ can be connected in parallel to the electrolysis cell to generate hydrogen more rapidly by increasing the total current ($I_{oper}$) as shown in FIG. 2. It would also be possible to optimize a PV-electrolysis system based on a PV system connected to an electrolyzer with multiple electrolysis cells in series (i.e., a multicell electrolyzer stack) by using the same method employed for a solar cell connected to a single electrolysis cell. In the case of the multicell PV-electrolyzer, the process of optimization would be done in the same way as for a single electrolysis cell except that the optimum PV voltage required to operate the multicell electrolyzer with N number of cells in series would be equal to approximately N times the voltage required for a single electrolysis cell.

Figure 12:
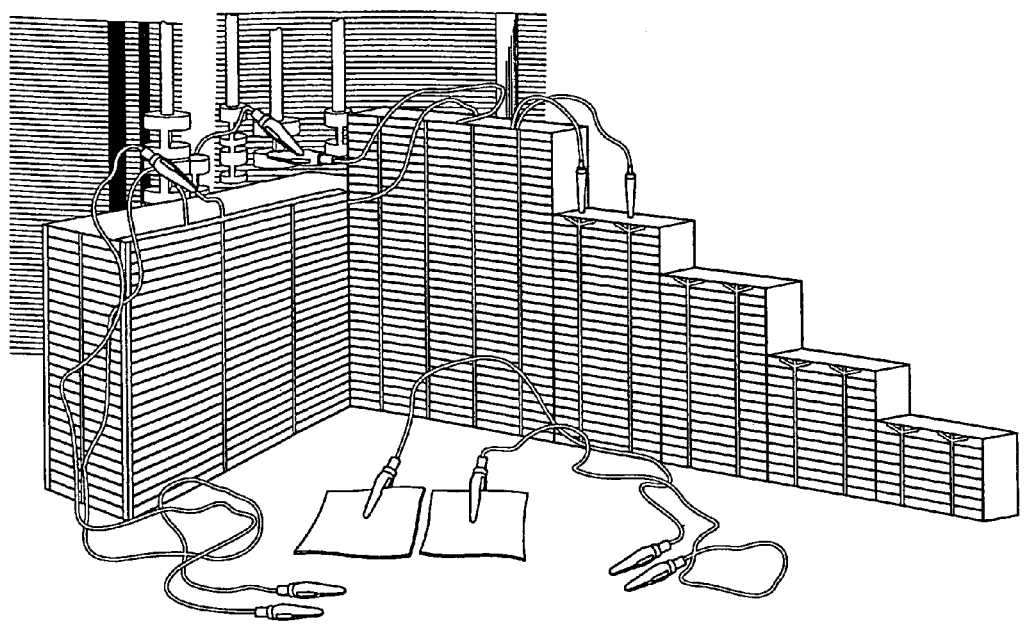
FIG. 12 is a photograph showing a-Si and c-Si solar modules and the tank reactor and electrodes used to optimize the efficiency of hydrogen production by PV-electrolysis.

The requirements for an optimized PV-electrolysis system determined in this system and its preferred embodiment are summarized in Table 2. The main components of the experimental PV-electrolysis systems optimized are shown in FIG. 12.

TABLE 2

Characteristics for an Optimized PV-Electrolysis System for Hydrogen Production

| | Characteristics | Benefits |
|---|---|---|
| Electrolyte | 5 M (22%-25% by mass) KOH | Maximum electrolyte conductivity & electrode durability |
| Electrodes | Ni cathode & Ni-RuO$_2$ anode | Optimum electrode efficiency & minimum over potential |
| Current density | Less than 12 mA/cm$^2$ | Electrodes sized for maximum efficiency |
| PV Module | Design with $E_{mpp}$ of 2.5 (2.0-3.0) volts DC | Optimum match of PV voltage with electrolysis system voltage |

The features of this optimization process include:

An optimization process for scaling up solar hydrogen production that yields up to 7.2% efficiency, which is greater than any reported PV-electrolysis efficiency.

Reducing cost for hydrogen production to about $3 per kg due to the simplified, 7.2% efficient system and eliminating many prior art components such as voltage converters, controllers, and batteries.

The efficiency optimization process described above which requires simple efficiency determination using measurements of current and the area of the PV system and use of manufacturer's mpp specifications to estimate the number of solar cells in series that give maximum hydrogen generation efficiency.

An optimized PV-electrolysis system design and preferred embodiment consisting of: (1) a nickel foil cathode (hydrogen production electrode), (2) a specially treated ruthenium dioxide ($RuO_2$) coated nickel foil anode as described above (oxygen production electrode), (3) 5 M aqueous potassium hydroxide electrolyte solution, (4) a PV system consisting of 6 or 7 crystalline silicon solar cells in series to produce the optimum $E_{mpp}$ of 2.0 to 3.0 volts, (5) an external circuit such as a wire or ammeter as shown in FIG. 2 to electrically connect the PV system to the electrodes in the electrolysis chamber and (6) an electrolysis chamber consisting of cathode and anode sections separated by an impermeable divider from the top of the chamber to a point below the bottom of the electrodes, which allows the bubbles of hydrogen and oxygen gas to rise to the top of the chamber separately. The electrolyte in the anode and cathode sections is connected, however, by an opening or salt bridge at the bottom of the chamber as shown in FIG. 2 to provide electrochemical connection between the electrodes that is necessary for ion transport and electrolysis to occur. The balance of the gas generation system needed for producing hydrogen fuel requires only commercially available gas purification equipment, piping, compression, and storage modules.

The optimized PV-electrolysis system in this system can be given appropriate corrosion resistant encapsulation to become a photoelectrochemical (PEC) device in a self-contained, scaled-up solar hydrogen generator using a photoelectrochemical device in a plastic specially designed chamber to increase the rate of the hydrogen production by focusing and concentrating natural sunlight on the PV system. This could potentially raise the hydrogen production rate by severalfold. Using the optimized design of this system in such special chamber further reduces the cost of hydrogen fuel production significantly by reducing the area of the PV panels needed to achieve the optimal current density in a PEC reactor.

The cost estimate for renewable solar hydrogen generation for the PV-electrolysis system, according to the present invention, is projected to be as low as gasoline for the same mileage. Optimized PV-electrolysis production of hydrogen could cost $2-3 per gallon of gasoline equivalent, compared to more than $11 per gallon of gasoline equivalent for solar-generated hydrogen from current photovoltaic and electrolyzer technology.

The scaled-up, optimized PV-electrolysis design of this system could be built with currently available, commercial manufacturing processes, utilizing commercially available photovoltaic cells and electrolyzers to make inexpensive, practical fueling systems able to produce hydrogen on a home fueling scale or for various large or small fleet fueling projects without air pollution or global warming. The efficiency, durability, and cost of the resulting solar hydrogen systems have been explored and would be competitive with conventional fossil fuels. Also, the scale up in the size of this device should be linear, since it would merely involve connecting several PV modules to larger electrolysis cells and/or connecting the hydrogen gas output of many small reactors to a common storage system.

Current photovoltaic modules connected to prior art electrolyzers could also be used to split water, but the cost of the hydrogen (more than $11 per gallon of gasoline equivalent) would be much higher than hydrogen from our optimized PV-electrolysis design or PEC devices which do the same thing. Either of the photovoltaic devices mentioned earlier (single or multi-junction amorphous silicon and crystalline silicon) could be used in the system with a KOH solution and sunlight.

The optimized PV-electrolysis system has an efficiency of about 7% for conditions referred to as AM1.5 global (this is approximately noon time sun on a cloud-free day in the summer in the northern U.S.). Such conditions can provide the equivalent of approximately 6-8 hours of irradiance at 1000 $W/m^2$. For such conditions, the system provides a practical means of supplying renewable, non-polluting hydrogen fuel now by partnering with suppliers to make and further improve such systems. The solar hydrogen fueling systems could be built in most parts of the U.S. although they would be most productive in the desert Southwest and sunbelt areas. The system works, albeit at a reduced hydrogen output, on cloudy days. The protective surfaces that are currently used on commercially available solar cells (glass and plastics resistant to attack by ozone and other atmospheric pollutants) also resist attack by 5 M KOH used in our electrolysis system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating at an optimized condition an electrolysis system having at least one photovoltaic (PV) cell, supplying power to electrolyze water to produce hydrogen, comprising:
    a) determining a maximum power point voltage ($E_{mpp}$) for said PV cell based on a predetermined relationship between actual voltage and actual current under load for said PV cell; and
    b) determining a number of cells at said $E_{mpp}$ to be connected to achieve a desired voltage to electrolyze water and satisfy required electrolysis system losses.

2. The method of claim 1, wherein said number of cells are in series and constitute a module.

3. The method of claim 2 wherein said module has an overall $E_{mpp}$ in a range of 2 to 3 volts.

4. The method of claim 2 wherein said module has an overall $E_{mpp}$ of about 2.5 volts.

5. The method of claim 1 wherein the desired voltage is an operating voltage in a range of 1.5 to 3.0 volts.

6. The method of claim 1 wherein the desired voltage is an operating voltage in a range of 1.8 to 2.5 volts for a single electrolysis cell.

7. The method of claim 1 wherein said $E_{mpp}$ of said number of cells corresponds to an open circuit voltage in a range of 3 to 4 volts.

8. The method of claim 2 wherein said $E_{mpp}$ of each said cell is about 0.41 volts and said cluster contains six cells connected in series.

9. The method of claim 1 wherein said $E_{mpp}$ of each said cell is about 0.41 volts and said desired operating voltage is about 2.5 volts.

10. The method of claim 2 wherein a plurality of said modules are arranged in parallel.

11. The method of claim 10, wherein hydrogen production of said system is proportionate to the number of said multiple modules.

12. A method for operating at an optimized condition an electrolysis system having at least one photovoltaic (PV) cell supplying power to electrolyze water to produce hydrogen, comprising:
    a) determining a relationship between actual voltage and actual current under load for at least one of the PV cells;

b) determining a maximum power point voltage ($E_{mpp}$) for said PV cells based on said relationship; and b) determining a number of cells in series at said $E_{mpp}$ to achieve a desired voltage to electrolyze and split water and satisfy electrolysis system losses.

13. A method for operating an electrolysis system having at least one photovoltaic (PV) cell supplying power to electrolyze water to produce hydrogen, comprising:
   determining a number of PV cells in series to achieve a desired voltage to electrolyze water and satisfy electrolysis system losses based on the maximum power point voltage ($E_{mpp}$) of said PV cell.

14. A method for operating at an optimized condition an electrolysis system having at least one photovoltaic (PV) cell, and electrodes coupled to the PV cell, to electrolyze water to produce hydrogen, comprising:
   determining a number of PV cells to achieve a desired voltage to electrolyze water and satisfy electrolysis system losses based on a maximum power point voltage ($E_{mpp}$) of said PV cell; and
   determining a maximum current density of said electrodes based on a predetermined relationship between electrolysis efficiency and current density.

15. The method of claim 14, wherein said current density is based on electrolysis current and PV cell area.

16. The method of claim 14 wherein said PV cell comprises a a-Si-based multi-junction semiconductor material or a c-Si based single junction cell semiconductor material.

17. The method of claim 14 wherein one of said electrodes is one of a photoanode or a photocathode.

18. The method of claim 14 wherein said desired voltage is an operating voltage in a range of 1.5 to 3.0 volts.

19. The method of claim 14 wherein said desired voltage is an operating voltage greater than 1.5V.

20. The method of claim 14 wherein said desired voltage is an operating voltage greater than 1.8V.

21. The method of claim 14 wherein said $E_{mpp}$ voltage of said number of cells is greater than or equal to 2.5V.

22. The method of claim 14 wherein said $E_{mpp}$ voltage of said number of cells is in a range of 2 to 3 volts.

23. The method of claim 14 wherein said operating voltage corresponds to an open circuit voltage in a range of 3 to 4 V.

24. The method of claim 14 wherein said open circuit voltage is less than 5V.

25. The method of claim 14 wherein said $E_{mpp}$ voltage of said number of cells is less than 4V.

26. The method of claim 14 wherein said maximum current density is less than 12 milliamps per square centimeter.

27. The method of claim 14 wherein said number of cells are in series and constitute a PV module.

28. The method of claim 27 wherein said electrolysis system comprises a plurality of said PV modules.

29. The method of claim 28 wherein each said PV module produces the optimum voltage to produce hydrogen in a respective electrolysis circuit comprising an anode, cathode, and electrolyte solution.

30. An electrolysis system comprising at least one photovoltaic (PV) cell delivering 1.8 to 2.5 volts DC ($E_{oper}$), current density less than 12 milliamps per $cm^2$, said PV cell having a nickel-based cathode, and an anode comprising a ruthenium oxide layer and a nickel-based layer.

31. The electrolysis system of claim 30 which comprises an electrolyte comprising KOH.

32. The electrolysis system of claim 30 which comprises an electrolyte comprising 5 molar KOH.

33. The electrolysis system of claim 30 wherein the PV cell has an open circuit voltage of 2 to 4 volts DC.

34. The electrolysis system of claim 30 wherein the PV cell has an open circuit voltage of 2.5 to 3.5 volts DC.

35. An electrolysis system having at least one photovoltaic (PV) cell supplying power to electrolyze water to produce hydrogen, comprising: a number of PV cells in series having a voltage sufficient to electrolyze water and satisfy electrolysis system losses based on a maximum power point voltage of said PV cell.

* * * * *